US008547717B2

(12) United States Patent
Kshirsagar

(10) Patent No.: US 8,547,717 B2
(45) Date of Patent: Oct. 1, 2013

(54) MULTILEVEL UNIDIRECTIONAL RECTIFIER WITH N-2 SWITCHES PER PHASE LEG

(75) Inventor: Parag Kshirsagar, Vernon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 495 days.

(21) Appl. No.: 12/787,875

(22) Filed: May 26, 2010

(65) Prior Publication Data

US 2011/0291737 A1 Dec. 1, 2011

(51) Int. Cl.
*H02M 7/217* (2006.01)
(52) U.S. Cl.
USPC ........................................................ 363/127
(58) Field of Classification Search
USPC ................................ 363/34, 37, 89, 126, 127
See application file for complete search history.

(56) References Cited

U.S. PATENT DOCUMENTS

| | | | | |
|---|---|---|---|---|
| 5,644,483 | A * | 7/1997 | Peng et al. | 363/37 |
| 6,459,596 | B1 * | 10/2002 | Corzine | 363/37 |
| 7,040,391 | B2 * | 5/2006 | Leuthen et al. | 166/65.1 |
| 7,751,212 | B2 * | 7/2010 | Perkinson | 363/127 |
| 7,920,394 | B2 * | 4/2011 | Nguyen | 363/41 |
| 2003/0128563 | A1 * | 7/2003 | Rojas Romero | 363/89 |
| 2007/0296383 | A1 * | 12/2007 | Xu et al. | 323/282 |
| 2008/0013352 | A1 * | 1/2008 | Baker | 363/125 |
| 2010/0142238 | A1 * | 6/2010 | Viitanen | 363/126 |
| 2011/0068723 | A1 * | 3/2011 | Maiocchi | 318/400.3 |

OTHER PUBLICATIONS

Kolar et al., A Novel 10kW 2-U Three-Phase Unity Power Factor Rectifier Module, 11th International Symposium on Power Electronics Ee 2001, Oct. 31-Nov. 2, 2001, pp. 1-5, Ee, Novi Sad, Yugoslavia.
Adachi et al., A Novel Five-level Three-phase PWM Rectifier using 12 Switches, 2009, pp. 3100-3107, IEEE.
Kolar et al., A Novel Three-Phase Utility Interface Minimizing Line Current Harmonics of High-Power Telecommunications Rectifier Modules, IEEE Transactions on Industrial Electronics, Aug. 1997, pp. 456-467, vol. 44, No. 4, IEEE.
Al-Haddad et al., A Review of Three-Phase Improved Power Quality AC-DC Converters, Jun. 2004, IEEE Transactions on Industrial Electronics, pp. 641-660, vol. 51, No. 3, IEEE.
Baker et al., Reduced Parts-Count Multi-Level Rectifiers, 2001, pp. 589-596, IEEE Xplore.
A. Ruderman, et al., "Voltage Modulation Strategies and Performance Limitations of Multilevel PWM Rectifiers," IEEE 2008; pp. 016-020.

* cited by examiner

*Primary Examiner* — Adolf Berhane
*Assistant Examiner* — Gary Nash
(74) *Attorney, Agent, or Firm* — Cantor Colburn LLP

(57) ABSTRACT

An N-level rectifier, wherein N is a number of voltage levels of the rectifier, includes an input; a plurality of switching devices connected in parallel, wherein the plurality of switching devices are connected to the input, wherein a number of the plurality of switching devices is equal to N-2; and a plurality of capacitors connected in series, wherein the plurality of capacitors are connected to the plurality of switching devices, wherein a number of the plurality of capacitors is equal to N-1, and wherein the plurality of capacitors are connected to an output of the N-level rectifier; wherein N is greater than three.

20 Claims, 11 Drawing Sheets

MULTILEVEL UNIDIRECTIONAL RECTIFIER WITH N-2 SWITCHES PER PHASE LEG

FIELD OF INVENTION

The subject matter disclosed herein generally relates to the field of multilevel rectifiers.

DESCRIPTION OF RELATED ART

Multilevel rectifiers are used to convert alternating current (AC) power to direct current (DC) power. Rectifiers may be employed in many types of power applications, such as aerospace or naval ship systems, adjustable-speeds drives, uninterruptible power supplies, utility interfaces with nonconventional energy sources such as solar photovoltaic systems or wind energy systems, battery energy storage systems, process technology such as electroplating or welding units, battery charging for electric vehicles, and for power supplies for telecommunication systems. Rectifiers may be built using solid-state devices such as metal oxide semiconductor field effect transistors (MOSFETs), insulated gate bipolar transistors (IGBTs), or gate-turn-off thyristors (GTOs). Reduction in the number of components needed to build a rectifier may reduce the price and complexity of the rectifier. A Vienna rectifier (see, for example, Kolar and Zach, "A Novel Three-Phase Utility Interface Minimizing Line Current Harmonics of High-Power Telecommunications Rectifier Modules", IEEE Vol. 44 No. 4, p. 456, August 1997 for more information), is a rectifier topology that requires a relatively low number of components; however, the Vienna rectifier only offers three-level power conversion.

BRIEF SUMMARY

According to one aspect of the invention, an N-level rectifier, wherein N is a number of voltage levels of the rectifier, includes an input; a plurality of switching devices connected in parallel, wherein the plurality of switching devices are connected to the input, wherein a number of the plurality of switching devices is equal to N−2; and a plurality of capacitors connected in series, wherein the plurality of capacitors are connected to the plurality of switching devices, wherein a number of the plurality of capacitors is equal to N−1, and wherein the plurality of capacitors are connected to an output of the N-level rectifier; wherein N is greater than three.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for a multilevel rectifier with N−2 switches, where N is the number of output voltage levels per phase leg, are provided, with exemplary embodiments being discussed below in detail. The number of levels provided by a rectifier determines the increment at which the voltage waveform output may be stepped; therefore, a higher number of levels gives a better voltage waveform output. The switches in the multilevel rectifier may comprise bidirectional switches, comprising multiple diodes, or reverse blocking switches. Reduction in the number of switches allows for reduction in the complexity of the multilevel rectifier itself, and in the circuitry required to operate the multilevel rectifier, including but not limited to gate drivers, digital signal processors (DSPs), or control pins. The N−2 switch per phase leg rectifier topology may be generalized to any desired number of levels. The N-level rectifier may have a reduced total harmonic distortion (THD) at relatively low common mode voltages with an increased number (N) of levels. The THD for a 3-level rectifier may show a 50% reduction over the THD of a 2-level rectifier; the THD for a 4-level rectifier may show a 33% reduction over the THD of a 3-level rectifier; and the THD for a 5-level rectifier may show a 25% reduction over the THD of a 4-level rectifier in some embodiments.

Figure 1:
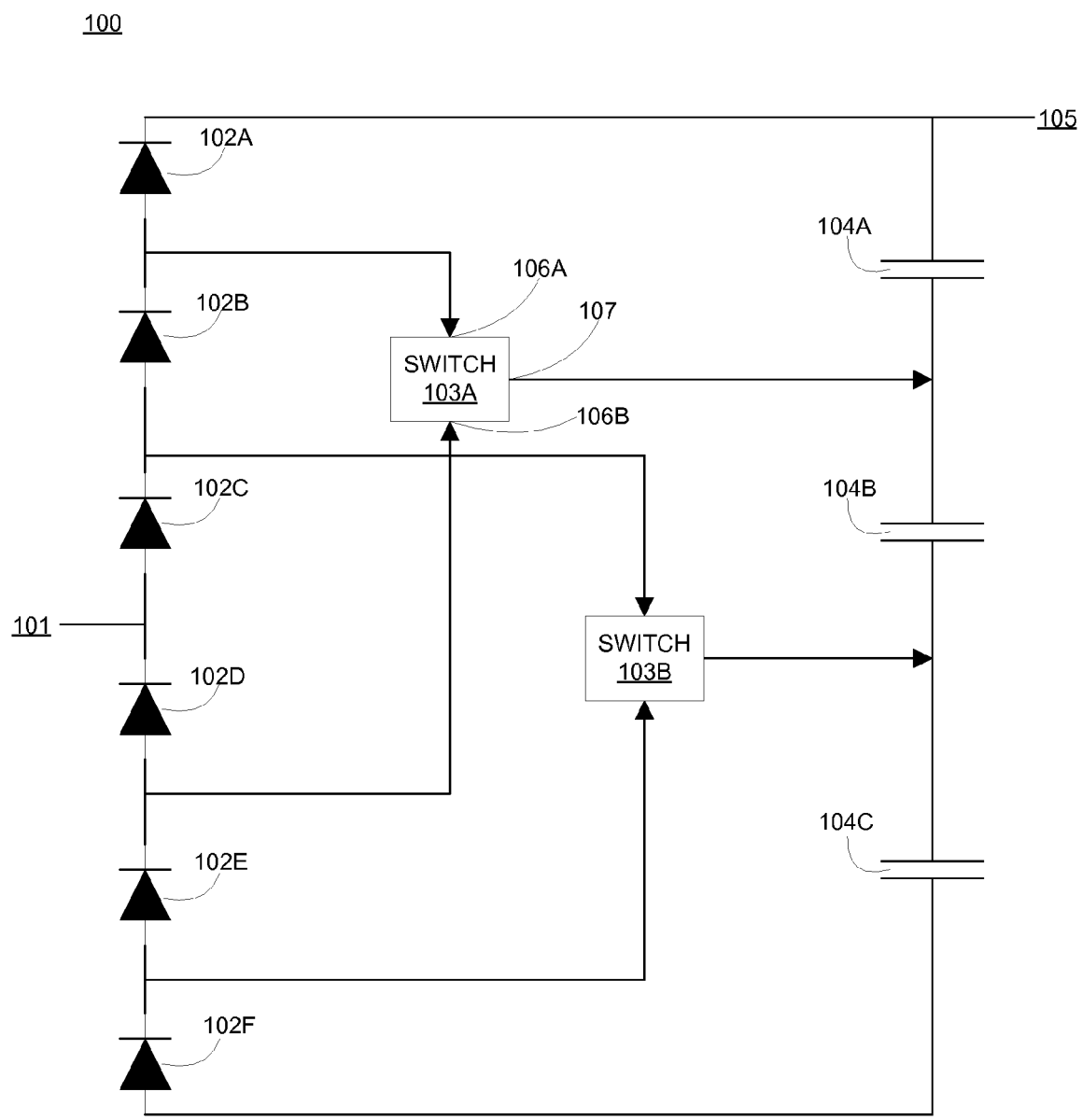
FIG. 1 illustrates an embodiment of a 4-level rectifier having 2 switches per phase leg.

FIG. 1 illustrates an embodiment of a 4-level rectifier 100 having 2 switches per phase leg. 4-level rectifier 100 comprises input 101, a series of diodes 102A-F, a series of capacitors 104A-C, switches 103A-B connected between the diodes 102A-F and capacitors 104A-C, and output 105. Switches 103A-B may each comprise a bidirectional switch such as is discussed in further detail below with respect to FIG. 4. Each of switches 103A-B has two inputs and one output, as illustrated by inputs 106A-B and output 107 of switch 103A. Each of the inputs of switches 103A-B are connected between a respective pair of diodes 102A-F, and the outputs of each of switches 103A-B are connected between a respective pair of capacitors 104A-C. 4-level rectifier 100 corresponds to a single phase leg.

Figure 2:
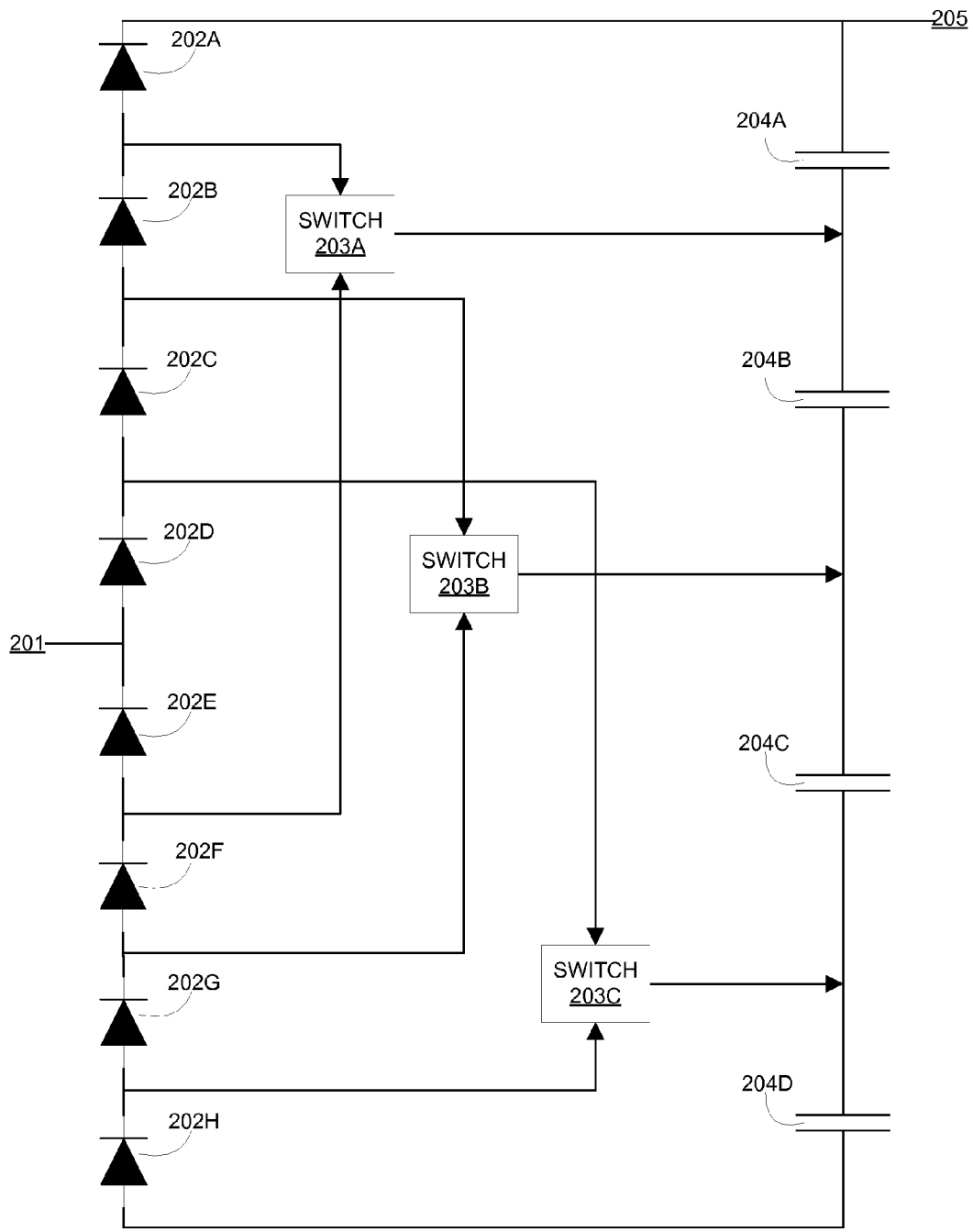
FIG. 2 illustrates an embodiment of a 5-level rectifier having 3 switches per phase leg.

FIG. 2 illustrates an embodiment of a 5-level rectifier 200 having 3 switches per phase leg. 5-level rectifier 200 comprises input 201, a series of diodes 202A-H, a series of capacitors 204A-D, switches 203A-C connected between the diodes 202A-H and capacitors 204A-D, and output 205. Switches 203A-C may each comprise a bidirectional switch such as is discussed in further detail below with respect to FIG. 4. Each of switches 203A-C has two inputs and one output. The inputs of each of switches 203A-C are connected between a respective pair of diodes 202A-H, and the outputs of each of switches 203A-C are connected between a respective pair of capacitors 204A-D. 5-level rectifier 200 corresponds to single phase leg.

Figure 3:
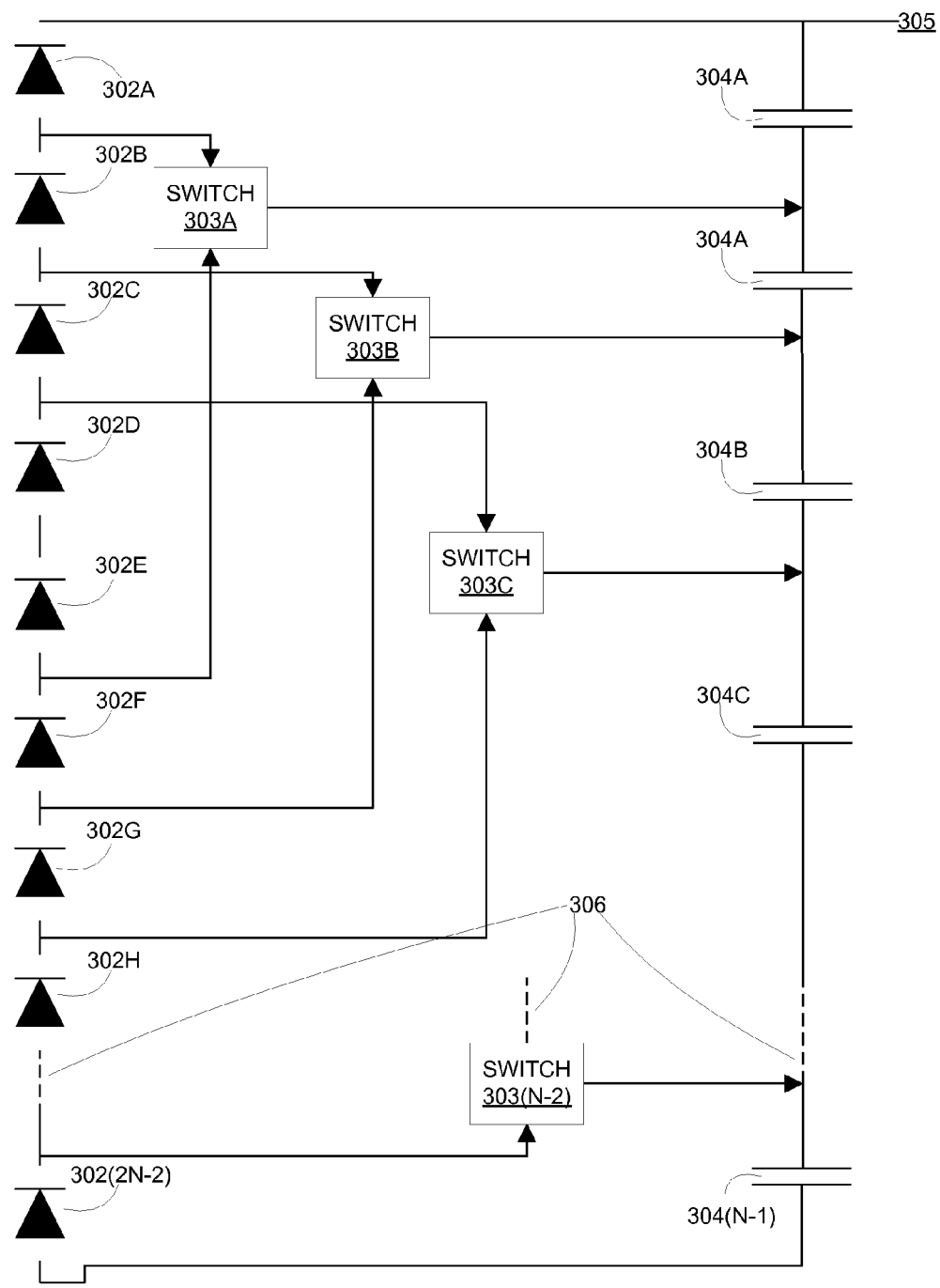
FIG. 3 illustrates an embodiment of an N-level rectifier having N−2 switches per phase leg.

FIG. 3 illustrates an embodiment of a generalized N-level rectifier 300 having N−2 switches per phase leg. N-level rectifier 300 comprises an input (not shown), a series of diodes 302A-(2N−2), a series of capacitors 304A to 304(N−1), switches 303A to 303(N−2) connected between the diodes 302A to 302(2N−2) and capacitors 304A to 304(N−1), and output 305. Dashed lines 306 indicate the location of any additional diodes, switches, capacitors, and electrical connections that are present in N-level rectifier 300. Switches 303A to 303(N−2) may each comprise a bidirectional switch such as is discussed in further detail below with respect to FIG. 4. Each of switches 303A to 303(N−2) has two inputs and one output. The inputs of each of switches 303A to 303(N−2) are connected between a respective pair of diodes 302A to 302(2N−2), and the outputs of each of switches 303A to 303(N−2) are connected between a respective pair of capacitors 304A to 304(N−1). N-level rectifier 300 corresponds to a single phase leg.

Figure 4:
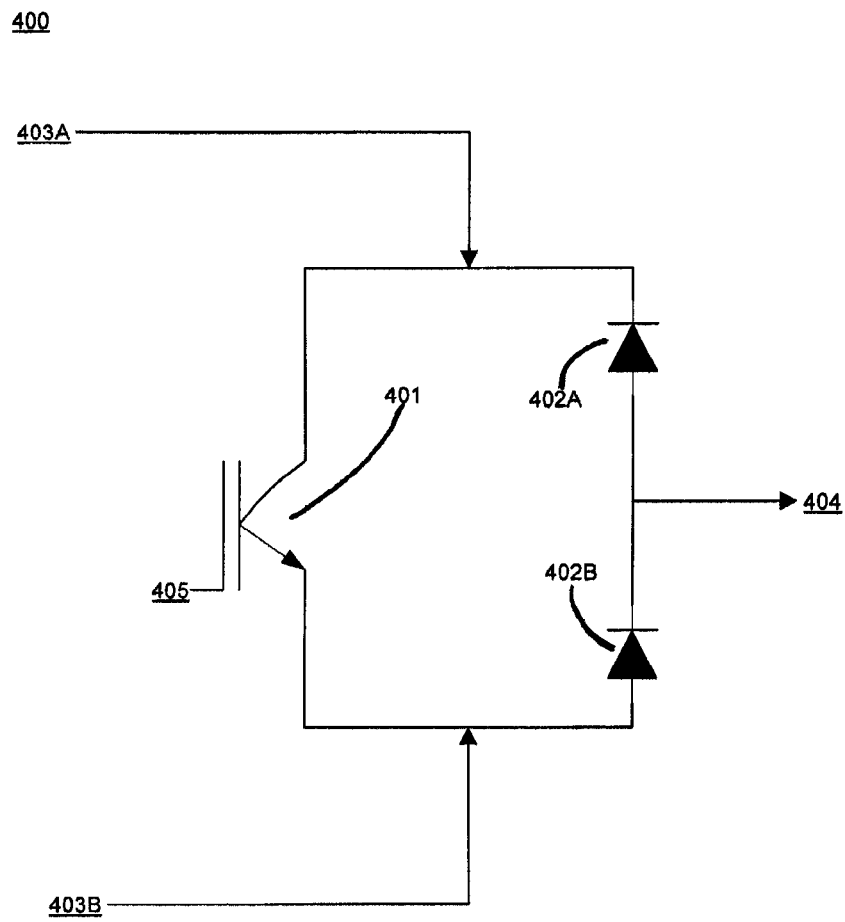
FIG. 4 illustrates an embodiment of a bidirectional switch.

FIG. 4 illustrates an embodiment of a bidirectional switch 400, which may comprise any of switches 103A-B, 203A-C, or 303A-(N−2). Bidirectional switch 400 comprises switching element 401 and diodes 402A-B connected between inputs 403A-B and output 404. Switching element 401 comprises a gate drive connection 405 that controls switching element 401. The bidirectional switch 400 allows flow of current in both directions while blocking the voltages when reverse biased. In some embodiments, switches 103A-B, 203A-C, or 303A-(N−2) may comprise reverse blocking switches in place of the bidirectional switch 400 of FIG. 4.

Figure 5:
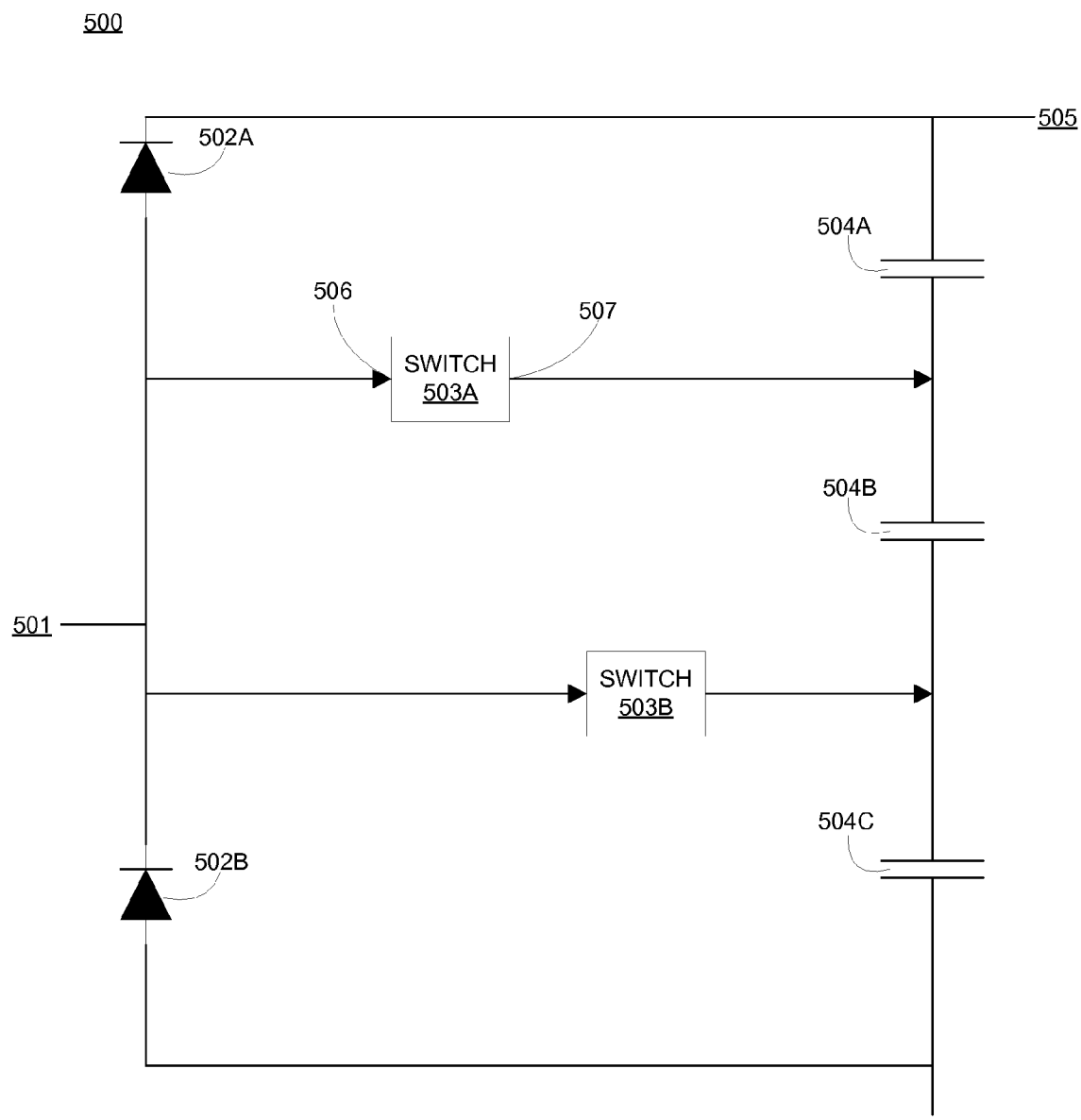
FIG. 5 illustrates an embodiment of a 4-level rectifier having 2 switches per phase leg.

FIG. 5 illustrates an alternate embodiment of a 4-level rectifier 500 having 2 switches per phase leg. 4-level rectifier 500 comprises input 501, diodes 502A-B, a series of capacitors 504A-C, switches 503A-B connected between the input 501, diodes 502A-B, and capacitors 504A-C, and output 505. Switches 503A-B may each comprise a bidirectional switch such as is discussed in further detail below with respect to FIG. 7. Each of switches 503A-B has one input and one output, as illustrated by input 506 and output 507 of switch 503A. The inputs of switches 503A-B are connected to the input 501, and the outputs of switches 503A-B are connected between a respective pair of capacitors 504A-C. 4-level rectifier 500 corresponds to a single phase leg.

Figure 6:
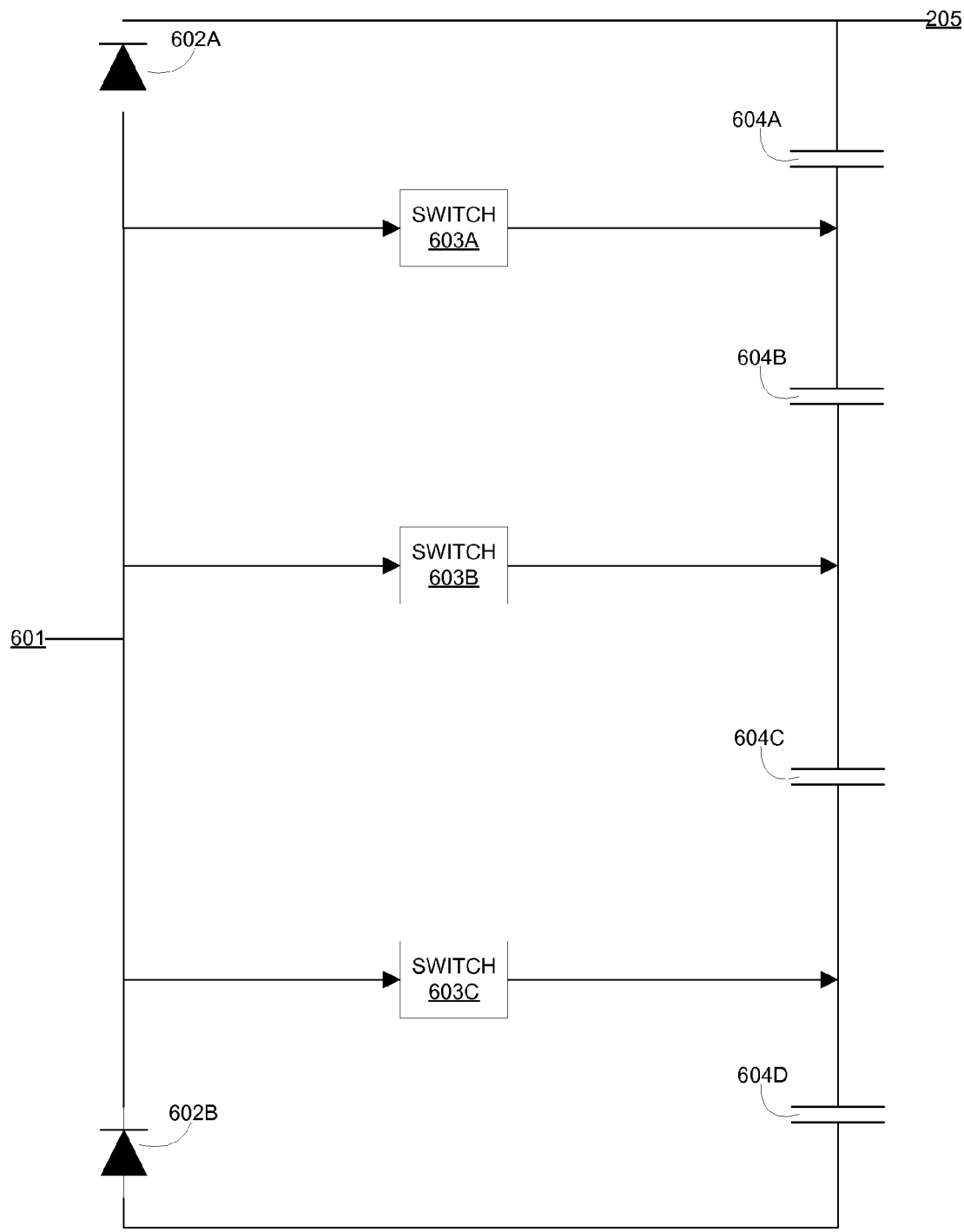
FIG. 6 illustrates an embodiment of a 5-level rectifier having 3 switches per phase leg.

FIG. 6 illustrates an embodiment of a 5-level rectifier 600 having 3 switches per phase leg. 5-level rectifier 600 comprises input 601, diodes 602A-B, a series of capacitors 604A-D, switches 603A-C connected between the input 601, diodes 602A-B, and capacitors 604A-D, and output 605. Switches 603A-C may each comprise a bidirectional switch such as is discussed in further detail below with respect to FIG. 7. Each of switches 603A-C has one input and one output. The inputs of each of switches 603A-C are connected to the input 601, and the outputs of each of switches 603A-C are connected between a respective pair of capacitors 604A-D. 5-level rectifier 600 corresponds to single phase leg. Similarly to the N-level rectifier 300 of FIG. 3, the topology of rectifiers 500 of FIGS. 5 and 600 of FIG. 6 may be generalized to any desired number of levels with the addition of further switches and capacitors, with N−2 switches and N−1 capacitors per level.

Figure 7:
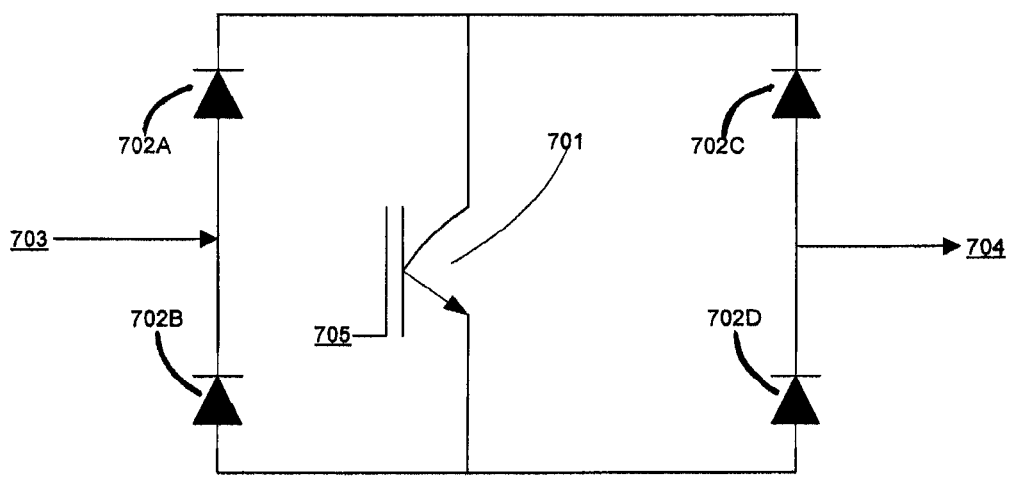
FIG. 7 illustrates an embodiment of a bidirectional switch.

FIG. 7 illustrates an embodiment of a bidirectional switch 700, which may comprise any of switches 503A-B and 603A-C. Bidirectional switch 700 comprises switching element 701 and diodes 702A-D connected between input 703 and output 704. Switching element 701 comprises a gate drive connection 705 that controls switching element 701. The bidirectional switch 700 allows flow of current in both directions while blocking the voltages when reverse biased. In some embodiments, switches 503A-B and 603A-C may comprise reverse blocking switches in place of the bidirectional switch 700 of FIG. 7.

Figure 8:
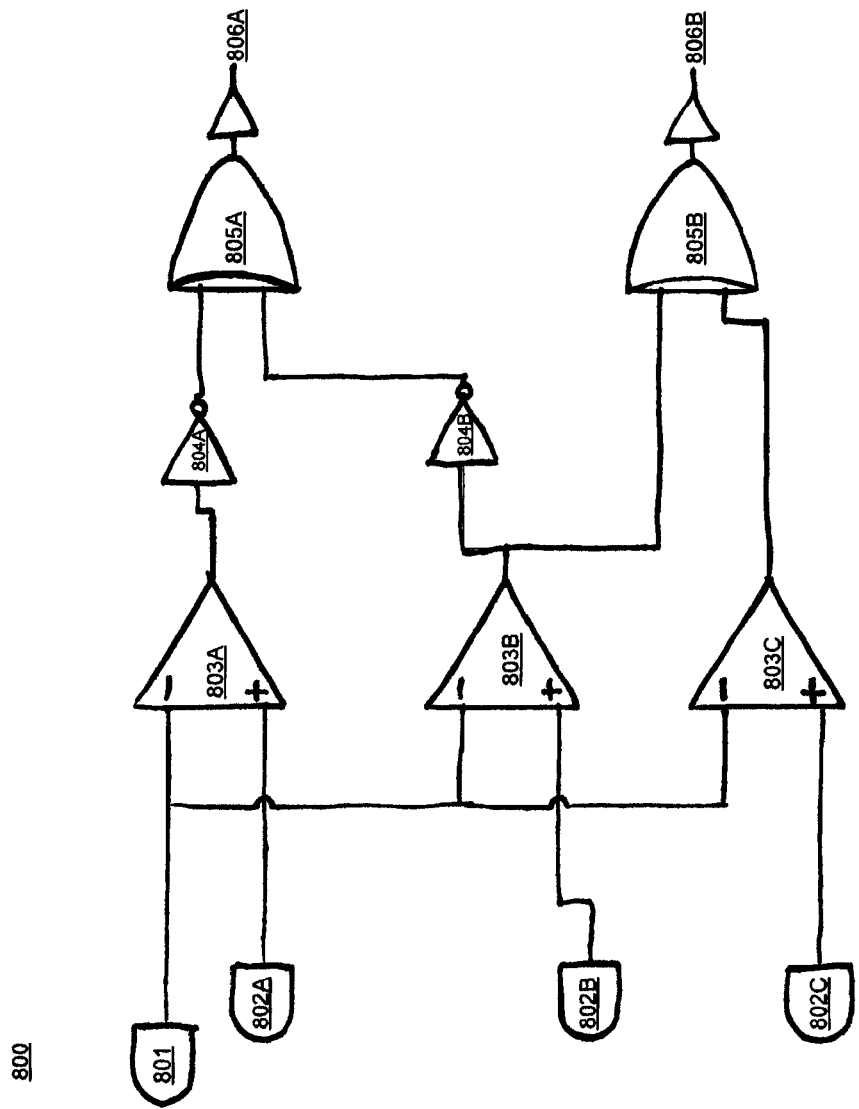
FIG. 8 illustrates an embodiment of a gate driver for a 4-level rectifier having 2 switches per phase leg.

FIG. 8 illustrates an embodiment of a gate driver 800 for a 4-level rectifier having 2 switches per phase leg, such as rectifier 100 of FIG. 1 and rectifier 500 of FIG. 5. Sinusoidal reference duty cycle 801 is connected to one of the inputs of each of differential amplifiers 803A-C, and three level-shifted triangle inputs 802A-C are connected to the remaining inputs of differential amplifiers 803A-C, respectively. The outputs of differential amplifiers 803A-C comprise a set of switching sequences, and are connected to the inputs of exclusive or (XOR) gate 805A via inverters 804A-B, respectively. The outputs of differential amplifiers 803A-C are also connected to the inputs of XOR gate 805B. The output 806A of XOR gate 805A may be connected to gate drive 405 (described in FIG. 4) of switch 103A of FIG. 1, or to gate drive 705 (described in FIG. 7) of switch 503A of FIG. 5. The output 806B of XOR gate 805B may be connected to gate drive 405 (described in FIG. 4) of switch 103B of FIG. 1, or to gate drive 705 (described in FIG. 7) of switch 503B of FIG. 5. Outputs 806A-B comprise a minimum distortion four-level waveform.

Figure 9:
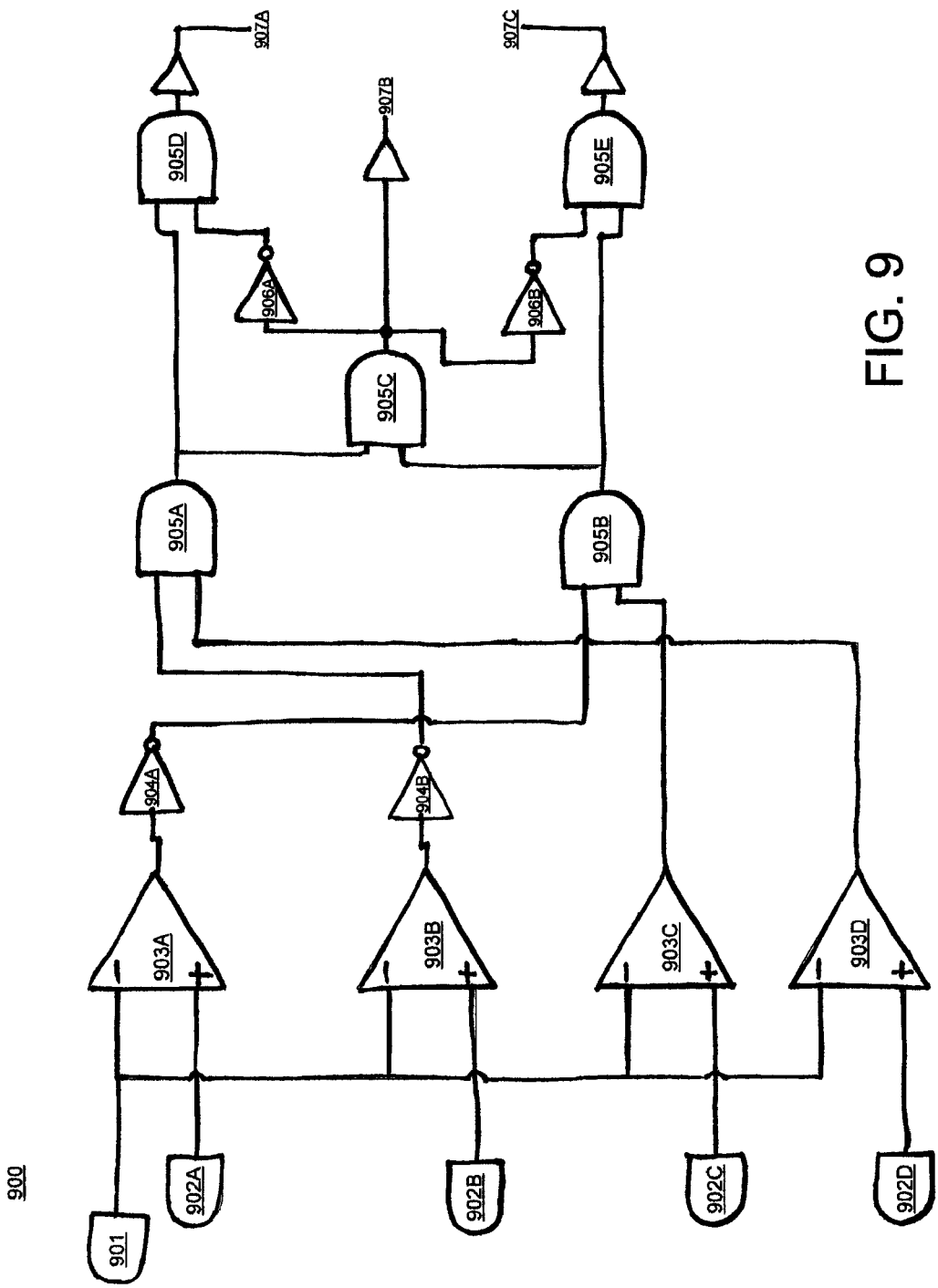
FIG. 9 illustrates an embodiment of a gate driver for a 5-level rectifier having 3 switches per phase leg.

FIG. 9 illustrates an embodiment of a gate driver 900 for a 5-level rectifier having 3 switches per phase leg, such as rectifier 200 of FIG. 2 and rectifier 600 of FIG. 6. Sinusoidal reference duty cycle 901 is connected to one of the inputs of each of differential amplifiers 803A-D, and four level-shifted triangle inputs 902A-D are connected to the remaining inputs of differential amplifiers 903A-D, respectively. The outputs of differential amplifiers 903A-D comprise a set of switching sequences, which are recombined using a recombination sequence comprising AND gates 905A-E, inverters 904A-B, and inverters 906A-B. The output of differential amplifier 903B is connected to an input of AND gate 905A via inverter 904B, and the output of differential amplifier 903D is connected to the other input of AND gate 905A. The output of differential amplifier 903A is connected to an input of AND gate 905B via inverter 904A, and the output of differential amplifier 903C is connected to the other input of AND gate 905B. The output of AND gate 905A is connected to an input of AND gate 905D and an input of AND gate 905C, and the output of AND gate 905B is connected to an input of AND gate 905E and an input of AND gate 905C. The output of AND gate 905C is connected via inverter 906A to the other input of AND gate 905D, and to the other input of AND gate 905D via inverter 906B. Output 907A of AND gate 905D may be connected to gate drive 405 (described in FIG. 4) of switch 203A of FIG. 2, or to gate drive 705 (described in FIG. 7) of switch 603A of FIG. 6. Output 907B of AND gate 905C may be connected to gate drive 405 (described in FIG. 4) of switch 203B of FIG. 2, or to gate drive 705 (described in FIG. 7) of switch 603B of FIG. 6. Output 907C of AND gate 905E may be connected to gate drive 405 (described in FIG. 4) of switch 203C of FIG. 2, or to gate drive 705 (described in FIG. 7) of switch 603C of FIG. 6. Outputs 907A-C comprise a minimum distortion five-level waveform.

Figure 10:
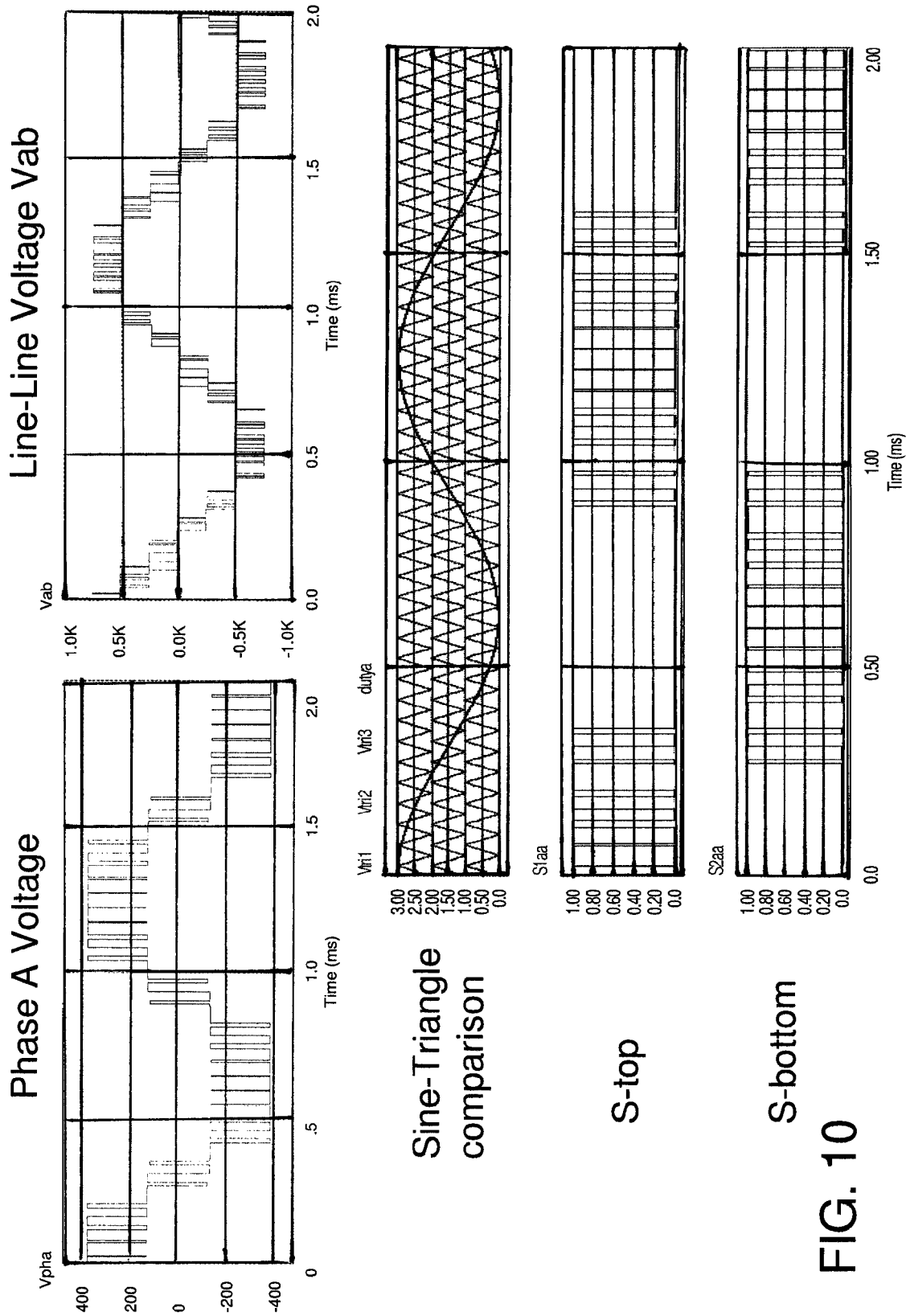
FIG. 10 illustrates an embodiment of a phase voltage waveform, line-line voltage waveform, sine-triangle comparison waveform, and switching waveforms for a 4-level rectifier having 2 switches per phase leg.
Figure 11:
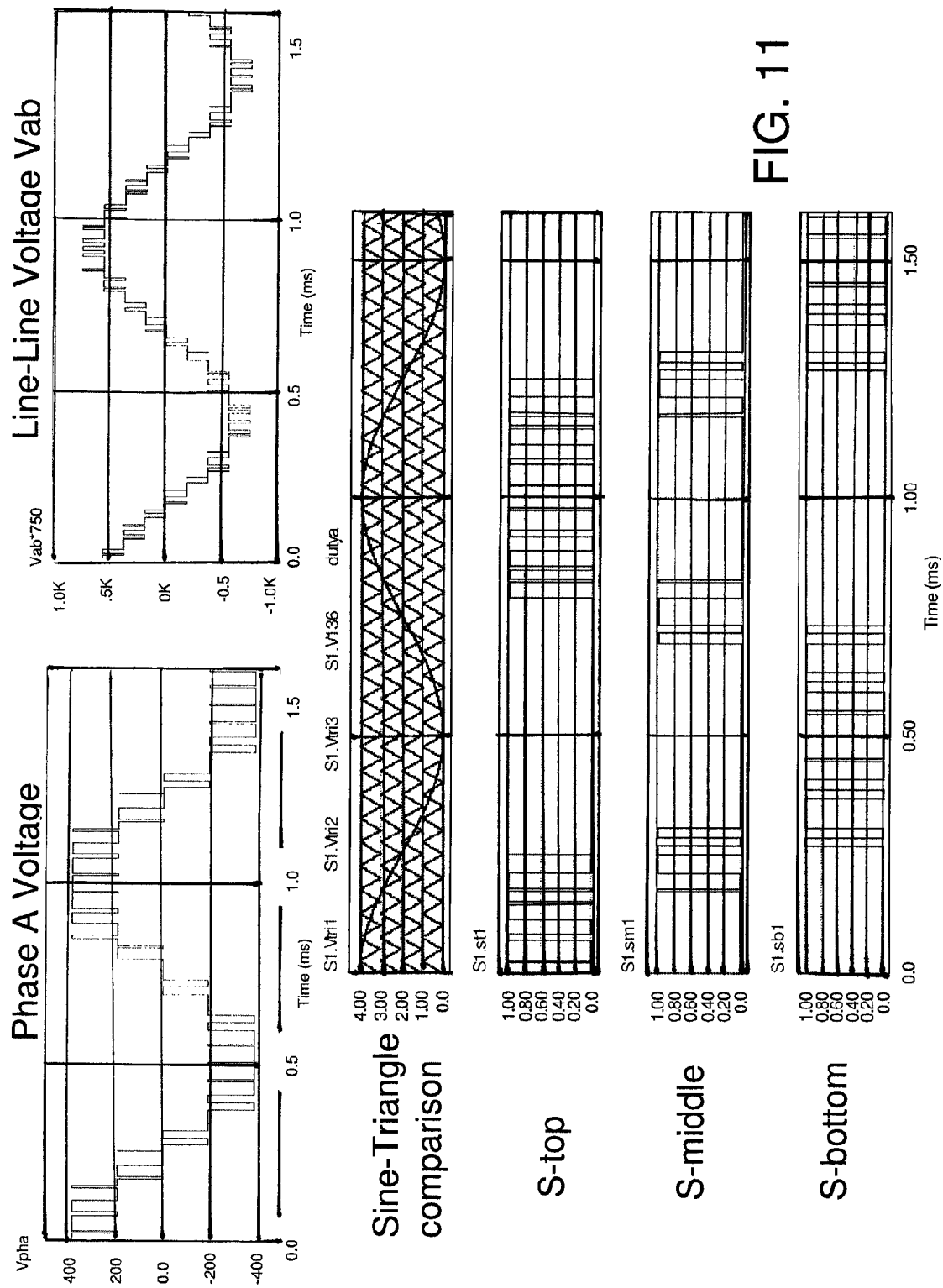
FIG. 11 illustrates an embodiment of a phase voltage waveform, line-line voltage waveform, sine-triangle comparison waveform, and switching waveforms for a 5-level rectifier having 3 switches per phase leg.

FIG. 10 illustrates embodiments of a phase voltage waveform, a line-line voltage waveform, a sine-triangle comparison waveform, and switching waveforms for a 4-level rectifier having 2 switches per phase leg, such as rectifier 100 of FIG. 1 or rectifier 500 of FIG. 5. Waveform S-top is a switching signal for the first switch of the rectifier (i.e., switch 103A or 503A), and waveform S-bottom is a switching signal for the second switch (i.e., switch 103B or switch 503B). FIG. 11 illustrates embodiments of a phase voltage waveform, a line-line voltage waveform, a sine-triangle comparison waveform, and switching waveforms for a 5-level rectifier having 3 switches per phase leg, such as rectifier 200 of FIG. 2 or rectifier 600 of FIG. 6. Waveform S-top is a switching signal for the first switch of the rectifier (i.e., switch 203A or 603A), waveform S-middle is a switching signal for the second switch (i.e., switch 203B or switch 603B), and waveform S-bottom is a switching signal for the third switch (i.e., switch 203C or switch 603C).

The technical effects and benefits of exemplary embodiments include a multilevel rectifier having a reduced number of components and reduced complexity.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An N-level rectifier, comprising:
   an input;
   a plurality of switching devices, wherein the plurality of switching devices are connected to the input, wherein a number of the plurality of switching devices is equal to N−2, and wherein each of the plurality of switching devices comprises a switching element comprising a gate drive, the gate drive of each of the switching devices being connected a respective output of a gate driver; and
   a plurality of capacitors connected in series, wherein the plurality of capacitors are connected to the plurality of switching devices, wherein a number of the plurality of capacitors is equal to N−1, and wherein the plurality of capacitors are connected to an output of the N-level rectifier;
   wherein N comprises a number of voltage levels of the N-level rectifier and is equal to 4, and the gate driver comprises a sinusoidal reference duty cycle that is compared to three level-shifted triangles by a 3 respective differential amplifiers to generate a set of switching sequences, wherein the output of the three differential amplifiers are recombined using two exclusive or (XOR) gates, and wherein the output of each of the XOR gates is connected to a respective gate drive of the switching element of each of the switching devices.

2. The N-level rectifier of claim 1, wherein the N-level rectifier corresponds to a single phase leg.

3. The N-level rectifier of claim 1, wherein the plurality of switching devices each comprise a bidirectional switching device.

4. The N-level rectifier of claim 3, wherein the plurality of switching devices each comprise two inputs, a switching element connected between the two inputs, and two diodes in series connected in parallel to the switching element between the two inputs, and an output located between the two diodes.

5. The N-level rectifier of claim 4, wherein the input of the N-level rectifier is connected to a plurality of diodes connected in series, wherein the plurality of diodes is located between the input of the N-level rectifier and the plurality of switching devices, and wherein a number of the plurality of diodes is 2N−2.

6. The N-level rectifier of claim 5, wherein the two inputs of each of the plurality of switching devices are connected between a different respective pair of the plurality of diodes, and the output of each of the plurality of switching devices is connected between a different respective pair of the plurality of capacitors.

7. The N-level rectifier of claim 3, wherein the plurality of switching devices each comprise an input, the input being connected between a first pair of diodes in series; a switching element connected in parallel with the first pair of diodes; a second pair of diodes in series connected in parallel with both the first pair of diodes and the switching element, and an output connected in between the second pair of diodes.

8. The N-level rectifier of claim 7, wherein the input of each of the plurality of switching devices is connected to the input of the N-level rectifier and the output of each of the plurality of switching devices is connected between a different respective pair of the plurality of capacitors.

9. The N-level rectifier of claim 8, wherein the N-level rectifier comprises a first diode connected between the plurality of switching elements and the output of the N-level rectifier, and a second diode connected between the plurality of switching elements and the plurality of capacitors.

10. The N-level rectifier of claim 1, wherein the plurality of switching devices comprise reverse blocking switches.

11. An N-level rectifier, wherein N is a number of voltage levels of the rectifier, comprising:
    an input;
    a plurality of switching devices, wherein the plurality of switching devices are connected to the input, wherein a number of the plurality of switching devices is equal to N−2, and wherein each of the plurality of switching devices comprises a switching element comprising a gate drive, the gate drive of each of the switching devices being connected a respective output of a gate driver; and
    a plurality of capacitors connected in series, wherein the plurality of capacitors are connected to the plurality of switching devices, wherein a number of the plurality of capacitors is equal to N−1, and wherein the plurality of capacitors are connected to an output of the N-level rectifier;
    wherein N comprises a number of voltage levels of the N-level rectifier and is equal to 5, and the gate driver comprises a sinusoidal reference duty cycle that is compared to four level-shifted triangles by a 4 respective differential amplifiers to generate a set of switching sequences, wherein the output of the 4 differential amplifiers are recombined using a recombination sequence comprising 5 AND gates and 4 inverters, and wherein the recombination sequence comprises 3 outputs that are connected to a respective gate drive of the switching element of each of the switching devices.

12. The N-level rectifier of claim 11, wherein the N-level rectifier corresponds to a single phase leg.

13. The N-level rectifier of claim 11, wherein the plurality of switching devices each comprise a bidirectional switching device.

14. The N-level rectifier of claim 13, wherein the plurality of switching devices each comprise two inputs, a switching element connected between the two inputs, and two diodes in series connected in parallel to the switching element between the two inputs, and an output located between the two diodes.

15. The N-level rectifier of claim 14, wherein the input of the N-level rectifier is connected to a plurality of diodes connected in series, wherein the plurality of diodes is located between the input of the N-level rectifier and the plurality of switching devices, and wherein a number of the plurality of diodes is 2N−2.

16. The N-level rectifier of claim 15, wherein the two inputs of each of the plurality of switching devices are connected between a different respective pair of the plurality of diodes, and the output of each of the plurality of switching devices is connected between a different respective pair of the plurality of capacitors.

17. The N-level rectifier of claim 13, wherein the plurality of switching devices each comprise an input, the input being connected between a first pair of diodes in series; a switching element connected in parallel with the first pair of diodes; a second pair of diodes in series connected in parallel with both the first pair of diodes and the switching element, and an output connected in between the second pair of diodes.

18. The N-level rectifier of claim 17, wherein the input of each of the plurality of switching devices is connected to the input of the N-level rectifier and the output of each of the plurality of switching devices is connected between a different respective pair of the plurality of capacitors.

19. The N-level rectifier of claim 18, wherein the N-level rectifier comprises a first diode connected between the plurality of switching elements and the output of the N-level rectifier, and a second diode connected between the plurality of switching elements and the plurality of capacitors.

20. The N-level rectifier of claim 11, wherein the plurality of switching devices comprise reverse blocking switches.

\* \* \* \* \*